US012340609B2

(12) United States Patent
Manson et al.

(10) Patent No.: US 12,340,609 B2
(45) Date of Patent: Jun. 24, 2025

(54) RECOGNIZING HANDWRITTEN TEXT BY COMBINING NEURAL NETWORKS

(71) Applicant: MyScript, Nantes (FR)

(72) Inventors: Gaël Manson, Nantes (FR); Guillermo Aradilla, Nantes (FR); Cyril Cerovic, Nantes (FR); Pierre-Michel Lallican, Nantes (FR)

(73) Assignee: MyScript, Nantes (FR)

( * ) Notice: Subject to any disclaimer, the term of this patent is extended or adjusted under 35 U.S.C. 154(b) by 291 days.

(21) Appl. No.: 17/925,251

(22) PCT Filed: May 11, 2021

(86) PCT No.: PCT/EP2021/062525
§ 371 (c)(1),
(2) Date: Nov. 14, 2022

(87) PCT Pub. No.: WO2021/228886
PCT Pub. Date: Nov. 18, 2021

(65) Prior Publication Data
US 2023/0230404 A1   Jul. 20, 2023

(30) Foreign Application Priority Data
May 15, 2020   (EP) .................................... 20305508

(51) Int. Cl.
*G06V 30/32*   (2022.01)
*G06V 10/82*   (2022.01)
(Continued)

(52) U.S. Cl.
CPC .............. *G06V 30/36* (2022.01); *G06V 10/82* (2022.01); *G06V 30/148* (2022.01);
(Continued)

(58) Field of Classification Search
CPC ..................................................... G06V 10/82
See application file for complete search history.

(56) References Cited

U.S. PATENT DOCUMENTS

2009/0077053 A1    3/2009  Lallican
2020/0090506 A1*   3/2020  Chen ..................... G06V 20/54
(Continued)

OTHER PUBLICATIONS

RO/EP: International Search Report mailed on Jun. 24, 2021 for corresponding International Application No. PCT/EP2021/062525; 4 pgs.
(Continued)

*Primary Examiner* — Edward Park
(74) *Attorney, Agent, or Firm* — McDermott Will & Emery LLP (57) ABSTRACT

A method for recognizing handwritten text is disclosed. The method comprises receiving data comprising a sequence of ink points; applying the received data to a neural network-based sequence classifier trained with a Connectionist Temporal Classification (CTC) output layer using forced alignment to generate an output; generating a character hypothesis as a portion of the sequence of ink points; applying the character hypothesis to a character classifier to obtain a first probability corresponding to the probability that the character hypothesis includes the given character; processing the output of the CTC output layer to determine a second probability corresponding to the probability that the given character is observed within the character hypothesis; and combining the first probability and the second probability to obtain a combined probability corresponding to the probability that the character hypothesis includes the given character.

13 Claims, 8 Drawing Sheets

(51) Int. Cl.
*G06V 30/148* (2022.01)
*G06V 30/18* (2022.01)
*G06V 30/19* (2022.01)
*G06V 30/10* (2022.01)

(52) U.S. Cl.
CPC .. *G06V 30/18057* (2022.01); *G06V 30/19153* (2022.01); *G06V 30/333* (2022.01); *G06V 30/10* (2022.01)

(56) References Cited

U.S. PATENT DOCUMENTS

| | | | |
|---|---|---|---|
| 2021/0295103 A1* | 9/2021 | Tanniru | G06V 10/7747 |
| 2023/0230404 A1* | 7/2023 | Manson | G06V 10/82 382/157 |
| 2024/0362937 A1* | 10/2024 | Malviya | G06V 30/19147 |

OTHER PUBLICATIONS

RO/EP: Written Opinion mailed on Jun. 24, 2021 for corresponding International Application No. PCT/EP2021/062525; 12 pgs.

Schambach Marc-Peter et al., "Stabilize Sequence Learning with Recurrent Neural Networks by Forced Alignment" 2013 12th International Conference on Document Analysis and Recognition—IEEE, Aug. 25, 2013—pp. 1270-1274.

Graves, A., et al. "A Novel Connectionist System for Unconstrained Handwriting Recognition." IEEE Transactions on Pattern Analysis and Machine Intelligence, IEEE Computer Society USA—vol. 31, No. 5, May 31, 2009—pp. 855-868.

* cited by examiner

RECOGNIZING HANDWRITTEN TEXT BY COMBINING NEURAL NETWORKS

CROSS-REFERENCE TO RELATED APPLICATIONS

This application is a U.S. National Phase application under 35 U.S.C. § 371 of International Application No. PCT/EP2021/062525, filed on May 11, 2021; which claims the benefit of priority to European Application No. 20305508.2, filed May 15, 2020; both of which are incorporated herein by reference in their entirety for all purposes.

FIELD OF THE INVENTION

The present invention relates to the field of recognizing handwritten text in touch-based user interfaces.

BACKGROUND

Various methods exist for unconstrained handwriting recognition.

One category of methods is based on recognizing individual characters before mapping the recognized characters onto words using a dictionary. Typically, these methods require a segmentation of words into segments (each segment corresponding to a character or a part of a character) and a classification of each segment or a group of segments. An example of such methods is described in U.S. Pat. No. 9,875,254.

A particular example of this category of explicit segmentation methods (hereinafter referred to as the "SEG" approach) is illustrated by a process 100 in FIG. 1.

Figure 1:
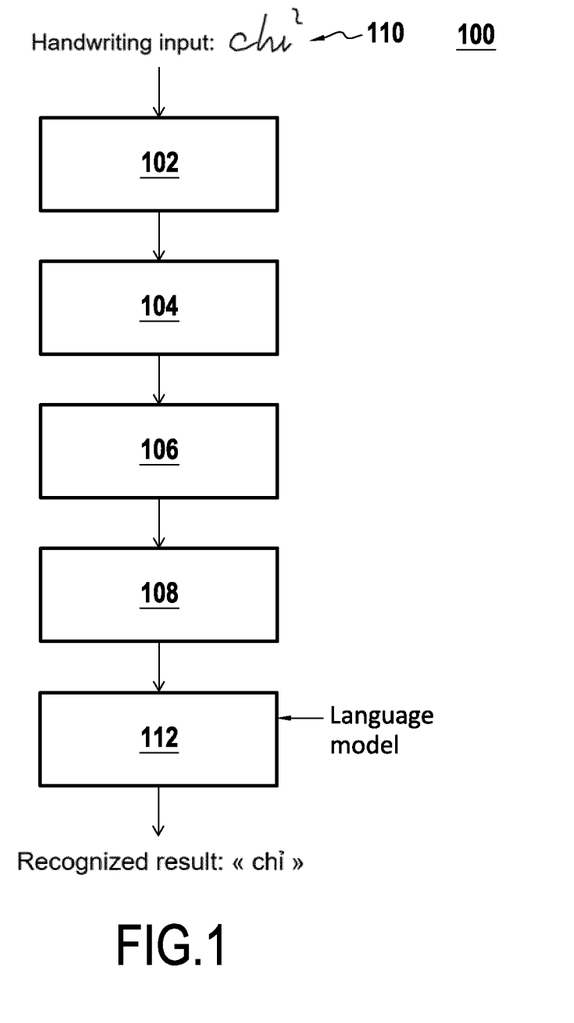
FIG. 1 illustrates a process of an explicit segmentation-based handwriting recognition approach (SEG approach)

As shown in FIG. 1, process 100 begins in step 102, which includes receiving a handwriting input 110 and pre-processing the received input. The handwriting input 110 includes data that represents a user input applied onto a touch-based user interface. Generally, the data comprises a sequence (time series) of ink points in a rectangular coordinate space. The sequence may be a character, a word, a line or multiple lines of text. The applied pre-processing in step 102 is configured to normalize the handwriting input 110. The normalization renders the handwriting input 110 invariable and independent of the initial writing style and of the input device. For example, the applied pre-processing may be as described in the paragraphs at column 11, lines 14-22 of U.S. Pat. No. 9,875,254, which paragraphs are incorporated herein by reference in their entirety. Alternatively or additionally, the applied pre-processing may be as described in Section II.A of "Graves et al., 'A Novel Connectionist System for Unconstrained Handwriting Recognition', IEEE Transactions on Pattern Analysis and Machine Intelligence, 2009" (hereinafter Graves).

Figure 2:
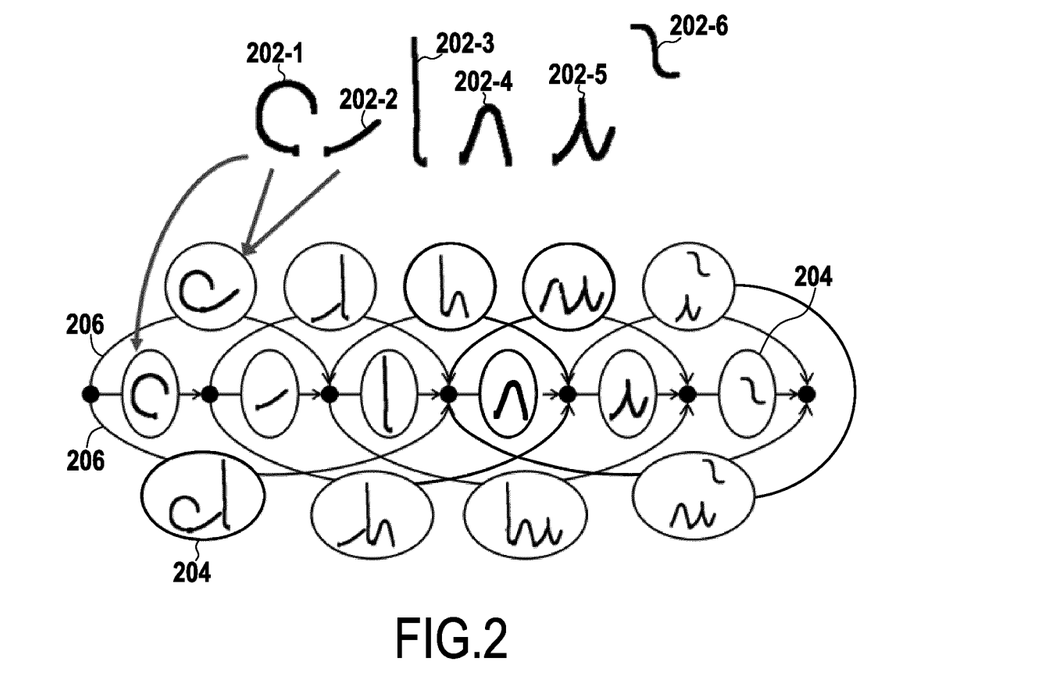
FIG. 2 illustrates an example of character-level segmentation according to the SEG approach.

Then, in step 104, the sequence of ink points representing the handwriting input 110 (with or without pre-preprocessing) are segmented into a plurality of segments. Typically, the segmentation is done at the "character" level and involves determining segmentation points from which the plurality of segments are obtained. The performed segmentation may be as described in the paragraphs at column 10, line 37 to column 11, line 2 of U.S. Pat. No. 9,875,254, which paragraphs are incorporated herein by reference in their entirety. The segmentation points may or may not be aligned with the ends of actual characters in the handwritten input and are not required to be so aligned for the purpose of the method. For example, FIG. 2 illustrates an example of character-level segmentation according to the SEG approach. In this example, the handwriting input is segmented into a plurality of segments 202-1, . . . , 202-6. As shown, the segments 202-1, . . . , 202-6 may correspond to portions of actual characters of the handwriting input.

Subsequently, in step 106, the plurality of segments are used to generate a plurality of character hypotheses. A character hypothesis is a set of one or more consecutive segments of the plurality of segments. FIG. 2 illustrates the generation of character hypotheses from the plurality of segments 202-1, . . . , 202-6. As shown, a hypothesis may consist of a single segment 202 of the plurality of segments 202-1, . . . , 202-6 or a combination of two or more consecutive segments of the plurality of segments 202-1, . . . , 202-6.

Step 106 may further include generating a segmentation graph as shown in FIG. 2. The segmentation graph comprises nodes 204 and branches 206. A node 204 corresponds to a respective character hypothesis of the plurality of character hypotheses. A branch 206 connecting two nodes represents an adjacency relationship between the nodes, namely that a segment of the first node is adjacent to a segment of the second node in the sequence of segments provided by the plurality of segments 202-1, . . . , 202-6.

Next, in step 108, each character hypothesis is associated with one or more character candidates. A character candidate, associated with a character hypothesis, is a set that includes a given character and an estimate of the probability that the character hypothesis is the given character. This estimate of the probability may be obtained using a character classifier. The character classifier may be based on a multilayer perceptron (MLP) approach. However, as would be understood by a person of skill in the art based on the teachings herein, the MLP approach may be replaced by any feedforward neural network approach, convolutional neural network (CNN) approach, or recurrent neural network (RNN) approach. MLP-based neural networks are known in the art. For the purpose of presentation only, and not limitation, the MLP approach is briefly described herein. The MLP approach is based on an architecture that consists of three or more layers (an input and an output layer with one or more hidden layers) of nonlinearly-activating nodes. Since MLPs are fully connected, each node in one layer connects with a certain weight to every other node in the following layer. Learning or training occurs in the MLP by changing connection weights after each input is processed, based on the amount of error in the output compared to the expected result. This is an example of supervised learning, and is carried out through back-propagation.

The character classifier may use a feature extraction method. For example, referring to FIG. 2, the character hypothesis consisting of segment 202-1 may be associated with character candidates including the characters "c" and "o". The character candidates include respectively estimates of the probabilities that the segment 202-1 is the character "c" and "o". Further detail regarding the generation of the segmentation graph, the determination of character candidates and the probability estimation can be found in the paragraphs at column 11, line 23 to column 12, line 29 of U.S. Pat. No. 9,875,254, which paragraphs are incorporated herein by reference in their entirety.

Finally, in step 112, the segmentation graph as generated in step 106, along with the generated character candidates and their associated probabilities in step 108, can be used to recognize words or terms in the handwriting input 110 using a language model. Specifically, the segmentation graph can be traversed to determine one or more optimal paths therein. The optimal paths may correspond to the paths with minimum costs. The cost of a path may be defined as being equal to the sum of the costs of the nodes in the path. The cost of a node, for a given character candidate, may be inversely proportional to the probability associated with the character candidate. For example, given a probability P, the cost of node may be given by the function (−log P). The determined optimal path(s) can then be mapped onto words or terms of the language model.

Generally, the SEG approach is advantageous for recognition tasks involving large vocabularies. However, the SEG approach may be suboptimal in the sense that only local features are considered during character hypothesis classification.

Another, more recent, category of handwriting recognition methods operates by directly recognizing a sequence of characters or words from the full sequence of ink points corresponding to the user input. In other words, no segmentation of the sequence of ink points is needed.

Figure 3:
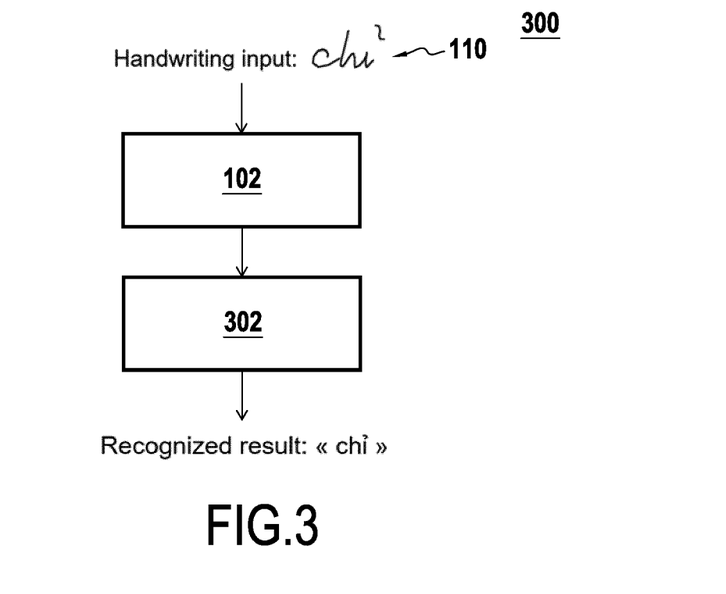
FIG. 3 illustrates a process of a handwriting recognition approach based on a neural network-based sequence classifier with a connectionist temporal classification (CTC) output layer (CTC approach)

An example of this category of methods is illustrated in FIG. 3, which shows a process 300 of a handwriting recognition approach based on a neural network-based sequence classifier with a connectionist temporal classification (CTC) output layer (hereinafter the "CTC approach"). The neural network-based sequence classifier may be a RNN, a CNN, or a Transformer encoder, for example. The RNN may have a standard RNN architecture or a particular RNN architecture, such as a Long Short Term Memory (LSTM) or a Gated Recurrent Unit (GRU) RNN architecture. For the purpose of presentation, the CTC approach is briefly described herein. However, a detailed description of the CTC approach can be found in Graves.

As shown in FIG. 3, process 300 begins in step 102, which includes receiving a handwriting input 110 and pre-processing the received input. As mentioned above, the handwriting input 110 includes data that represents a user input applied onto a touch-based user interface. Generally, the data comprises a sequence (time series) of ink points in a rectangular coordinate space. The applied pre-processing in step 102 is as described above with reference to process 100 of FIG. 1.

In step 302, the sequence of ink points (with or without pre-processing) are applied to a neural network-based sequence classifier with a CTC output layer. The CTC output layer generates a set of probabilities, for each character of a pre-defined alphabet (corresponding to the language of the handwriting input 110) and also for a "blank" character ("_"), the set of probabilities corresponding to the respective probabilities of observing the character (or the blank character) at each ink point of the sequence of ink points. Further detail regarding the CTC output layer and its output can be found in the third and fourth paragraphs ("A CTC output layer contains . . . the previous section") of section IV.D of Graves, which paragraphs are incorporated herein by reference in their entirety.

Figure 4:
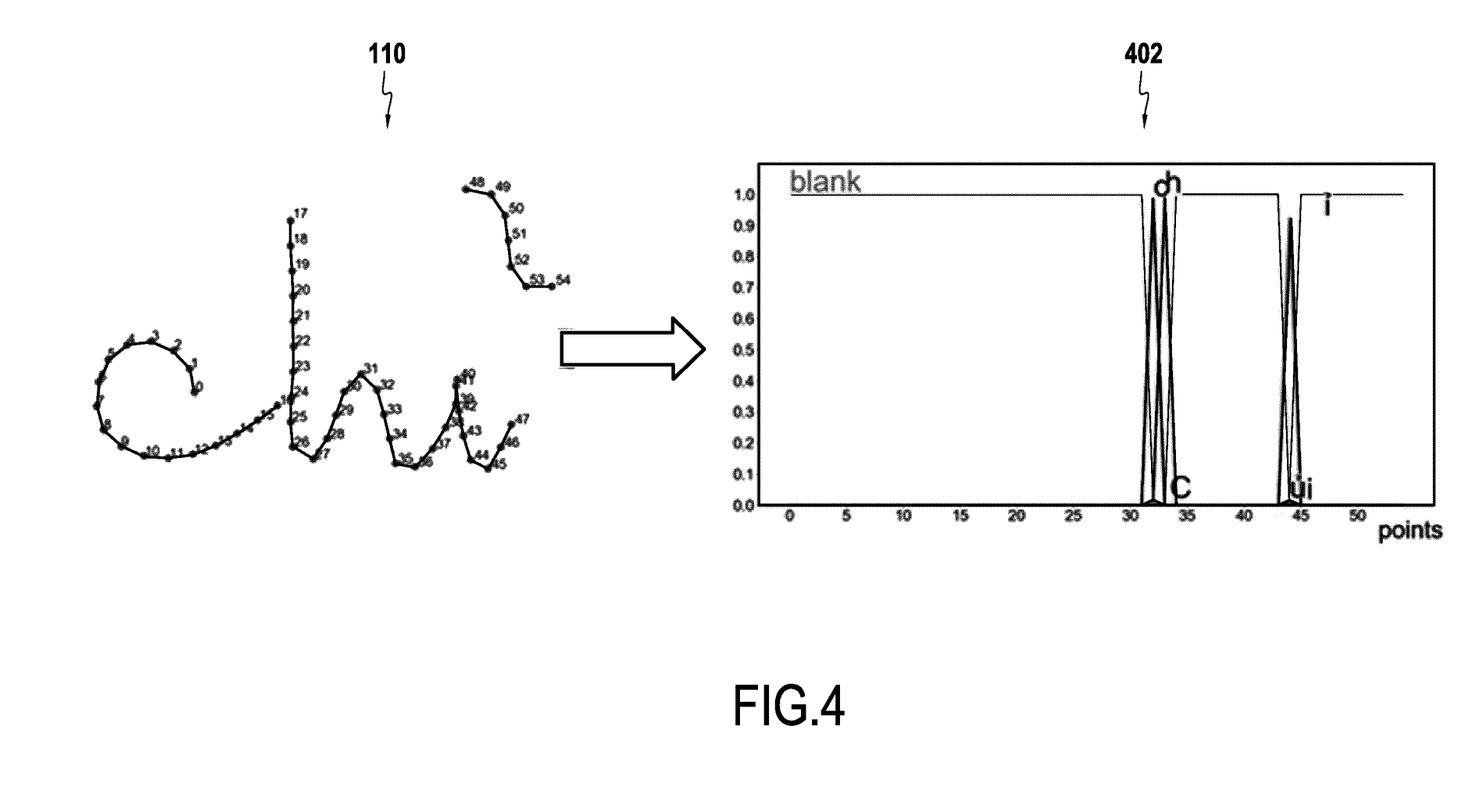
FIG. 4 is an example that illustrates the output of the CTC output layer in response to an input in the CTC approach.

For the purpose of illustration, the output 402 of a CTC output layer in response to the handwriting input 110 is shown in FIG. 4. As shown, the handwriting input includes 55 ink points. The output 402 of the CTC output layer includes, at each ink point, a probability distribution function that provides, for each character (including the blank character), the probability of observing the character at the ink point.

Typically, the CTC output layer is configured such that the blank character is observed at almost all ink points (i.e., probability of ~1.0 for the blank character and negligible or zero probability for all alphabet characters) and that, at only a few ink points, probability peaks (i.e., non-negligible probabilities) corresponding to actual alphabet characters are observed. However, the peak locations are not controlled in a standard CTC output layer. In other words, a probability peak that is observed for a given character does not occur until the neural network-based sequence classifier has processed enough of the time series of ink points to recognize that the character appears in the handwritten input. Thus, the probability peak for a given character may or may not occur at an ink point that belongs to the approximate ink range of the character in the handwritten input. For example, referring to FIG. 4, it can be seen that the probability peak for the character "c" only appears at around ink point number 30, whereas the character itself is represented approximately by ink points 0-12.

From the output of the CTC output layer, probabilities of observing different sequences of alphabet characters can be computed. Specifically, as described in the fifth and sixth paragraphs ("The conditional probability . . . (3)") of Graves, which are incorporated herein by reference in their entirety, first, conditional probabilities corresponding to different paths (including characters and/or blanks) being observed are calculated; and then, the paths are mapped to corresponding sequences of alphabet characters.

Figure 5:
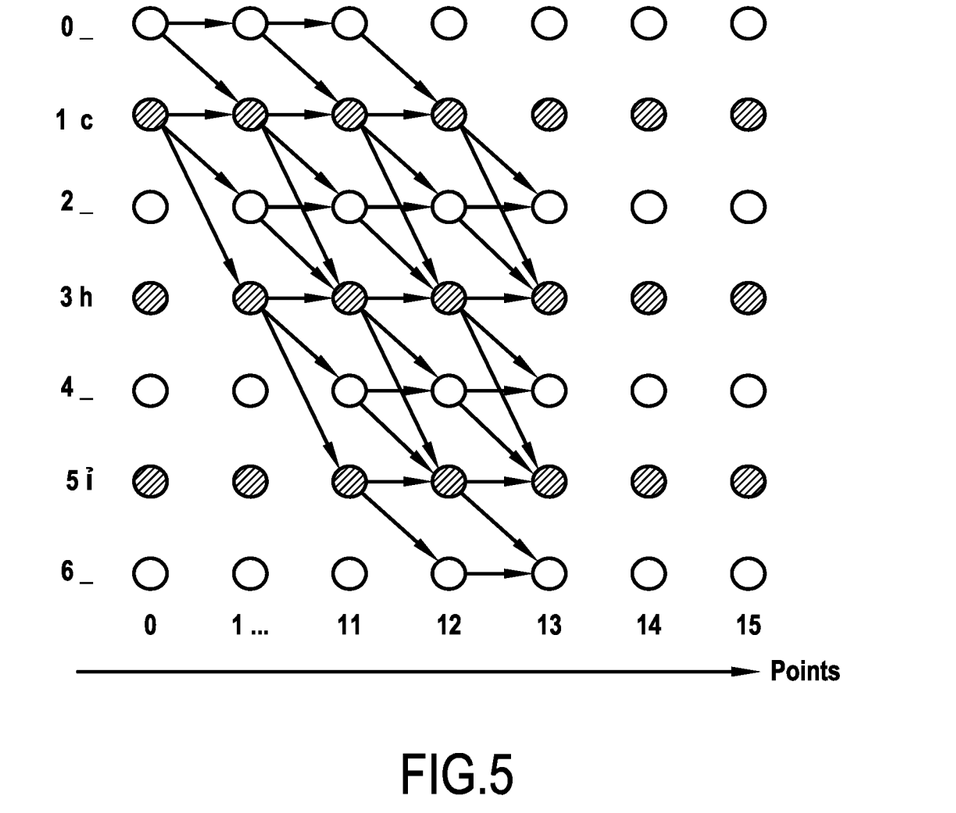
FIG. 5 illustrates a standard forward pass performed on the output of the CTC output layer.

For the purpose of illustration, FIG. 5 illustrates a standard forward pass that may be performed on the example output 402 of the CTC output layer shown in FIG. 4, to determine path conditional probabilities. For the purpose of presentation, only the points 1-15 actually appearing in the example handwriting input 110 are shown in FIG. 5. However, in practice, the forward pass encompasses all the points of the input, such as the example handwriting input 110. The forward pass computes the probability of the expected label (in 10 this example, the sequence "chi") by summing the probabilities of all paths that can lead to it.

As shown in FIG. 5, a path includes a character or a blank at each ink point of the sequence of ink points of the handwriting input 110. The conditional probability associated with a given path is calculated as the product of the probabilities associated with the observed characters/blanks of the path at the respective ink points. For example, for a path including a blank observed at ink point 0 and a "c" observed at ink point 1, the path conditional probability is equal to the product of, at least, the probability of observing a blank character at point 0 and the probability of observing the character "c" at point 1.

As shown in FIG. 5, a standard forward pass is unconstrained in the sense that considered paths are not limited to paths that actually correspond to the handwriting input 110. For example, in FIG. 5, it can be seen that a path that includes observing the character "h" at ink point 1 is considered, whereas in reality the "h" character occurs approximately between ink points 12 and 35 approximately.

The determined paths are mapped to sequences of alphabet characters by removing repeated characters and blanks. Different paths may be mapped to the same sequence of alphabet characters. For example, the paths (c, blank, h, i, blank) and (blank, c, c, blank, blank, c, h, i) both result in the sequence (c, h, i). The conditional probability associated with a given sequence of alphabet characters is equal to the sum of the conditional probabilities of all paths that are mapped to it.

A most probable sequence of alphabet characters corresponding to the handwriting input is finally determined as the sequence with the highest conditional probability. Further detail regarding this process known as CTC decoding can be found in the first and second paragraphs of section G of Graves, which paragraphs are incorporated herein by reference in their entirety.

Generally, the CTC approach is advantageous especially when the handwriting input is difficult to segment as it does not require segmentation. However, the lack of segmentation means that character ink ranges cannot be extracted and only global ink features derived by the neural network-based sequence classifier are used for recognition.

SUMMARY OF THE INVENTION

The present invention addresses some of the recognized deficiencies of the prior art. Specifically, the present invention proposes a hybrid SEG/CTC handwriting recognition approach. The hybrid approach combines the SEG and the CTC approaches and thereby benefits from both the local features derived by the SEG approach and the global features derived by the CTC approach. Experimental results show that the combined approach results in a greater word recognition rate than each of the approaches used separately.

In one aspect, the present invention provides a method for recognizing handwritten text in user input applied onto a touch-based user interface, comprising:
  receiving data representing the user input, the data comprising a sequence of ink points;
  applying the received data to a neural network-based sequence classifier trained with a Connectionist Temporal Classification (CTC) output layer using forced alignment to generate an output, wherein the output of the CTC output layer comprises, for a given character of a pre-defined alphabet, the probabilities of observing the given character at each ink point of the sequence of ink points;
  generating a character hypothesis as a portion of the sequence of ink points;
  applying the character hypothesis to a character classifier to obtain a first probability corresponding to the probability that the character hypothesis includes the given character;
  processing the output of the CTC output layer to determine a second probability corresponding to the probability that the given character is observed within the character hypothesis; and
  combining the first probability and the second probability to obtain a combined probability corresponding to the probability that the character hypothesis includes the given character.

Accordingly, the method allows for combining an SEG approach with a CTC approach for handwriting recognition. Further, the combination is done at the character hypothesis level, which allows for a greater number of candidates to be considered.

The neural network-based sequence classifier may be a recurrent neural network (RNN), a convolutional neural network (CNN), or a Transformer model, for example.

The character classifier may be based on a multilayer perceptron (MLP) approach.

In an embodiment, the received data is pre-processed.

In an embodiment, the sequence of ink points is segmented into a plurality of segments.

In an embodiment, the character classifier may be used in a forced alignment process to associate one or more segments (of the plurality of segments) with the given character.

In an embodiment, the character classifier is trained before the neural network-based sequence classifier.

In an embodiment, the neural network-based sequence classifier is trained with a CTC output layer using the result of a forced alignment process. The forced alignment process may be the process performed by the character classifier The forced alignment training of the neural network-based sequence classifier causes a peak probability among the probabilities of observing the given character to occur within the one or more respective segments associated with the given character. This allows for readily extracting the peak probability for the given character from the output of the CTC output layer.

In an embodiment, when the given character occurs more than once in the user input, each instance of the given character is associated with corresponding one or more respective segments. The output of the CTC output layer, for the given character, may comprise multiple peak probabilities (e.g., each peak probability in this case being a local maximum). Each peak probability occurs within respective one or more segments, which are associated to a respective instance of the given character.

In an embodiment, training the neural network-based sequence classifier comprises:
  applying an input sequence to the neural network-based sequence classifier; and
  limiting outputs of the neural network-based sequence classifier on each segment of a plurality of segments of the input sequence to a blank character or to a character of the input sequence associated with said each segment. The character of the input sequence may be associated with the said each segment by a forced alignment process, e.g., performed by the character classifier.

Limiting the outputs of the neural network-based sequence classifier in this fashion forces the CTC output layer to recognize the character of the input sequence only within the one or more respective segments of the input sequence containing the character.

In an embodiment, generating the character hypothesis comprises: segmenting the sequence of ink points into a plurality of segments; and generating the character hypothesis as one or more segments of the plurality of segments.

In an embodiment, processing the output of the CTC output layer to determine the second probability comprises filtering the output of the CTC output layer based on the character hypothesis; and decoding the filtered output to obtain the second probability.

In an embodiment, filtering the output of the CTC output layer comprises extracting from the output of the CTC output layer a set of probabilities corresponding to the character hypothesis.

In an embodiment, decoding the filtered output to obtain the second probability comprises:
  representing the given character by a hidden Markov model (HMM) having three states: blank, character, and blank; and
  performing a forward pass through the filtered output to compute the second probability.

In an embodiment, combining the first probability and the second probability to obtain the combined probability comprises calculating a weighted combination of the first probability and the second probability.

In another aspect, the present invention provides a computing device, comprising:
  a processor; and
  memory storing instructions that, when executed by the processor, configure the processor to perform a method according to any of the method embodiments described above.

In an embodiment, any of the above-described method embodiments may be implemented as instructions of a computer program. As such, the present disclosure provides a computer program including instructions that when executed by a processor cause the processor to execute a method according to any of the above-described method embodiments.

The computer program can use any programming language and may take the form of a source code, an object code, or a code intermediate between a source code and an object code, such as a partially compiled code, or any other desirable form.

The computer program may be recorded on a computer-readable medium. As such, the present disclosure is also directed to a computer-readable medium having recorded thereon a computer program as described above. The computer-readable medium can be any entity or device capable of storing the computer program.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

Systems and methods for a hybrid SEG/CTC handwriting recognition approach are disclosed herein.

Figure 6:
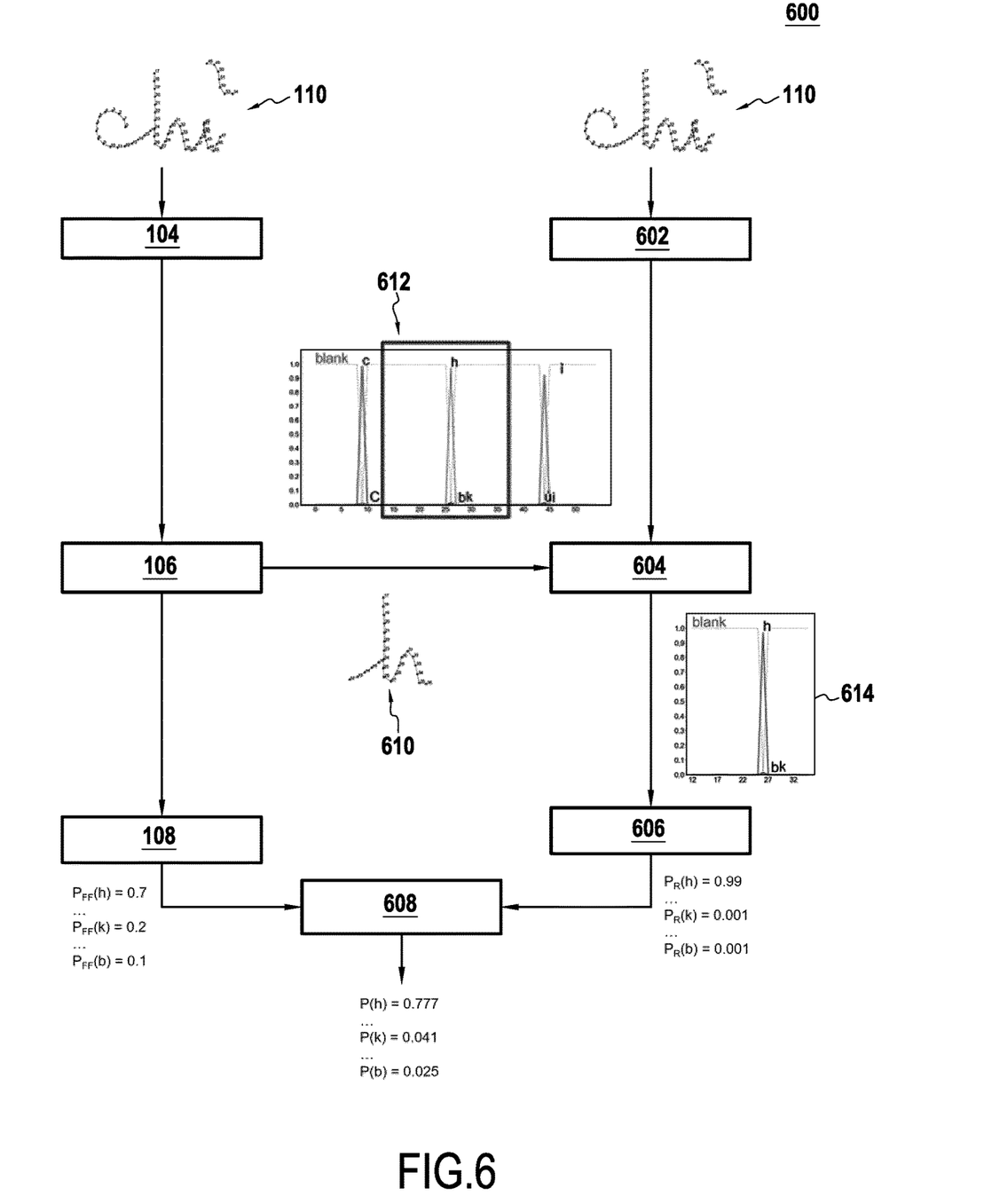
FIG. 6 illustrates a process of a hybrid SEG/CTC handwriting recognition approach according to an embodiment.

FIG. 6 illustrates a process 600 of a hybrid SEG/CTC handwriting recognition approach according to an embodiment. As shown in FIG. 6, process 600 begins by receiving a handwriting input 110. As mentioned above, the handwriting input 110 includes data that represents a user input applied onto a touch-based user interface. The data comprises a sequence (time series) of ink points in a rectangular coordinate space. The handwriting input 110 may be pre-processed as described above with respect to step 102 of FIG. 1.

The received data is applied in the shown steps 104, 106, and 108 to SEG-based handwriting recognition. As discussed above, this includes segmenting the received data in step 104, generating a plurality of character hypotheses based on the segmented data in step 106, and classifying the character hypotheses in step 108.

In an embodiment, step 108 includes applying a character hypothesis to a character classifier to obtain a first probability corresponding to the probability that the character hypothesis includes a given character. For the purpose of presentation only, FIG. 6 illustrates the processing from the perspective of a single character hypothesis, specifically in this example a character hypothesis 610 that includes ink points 12 to 36 and which is associated with the character candidates (h, k, and b). Accordingly, step 108 includes applying the character hypothesis 610 to the character classifier to obtain the probabilities that the character hypothesis 610 includes the characters (h, k, and b).

The received data is also applied in the shown step 602 to a modified CTC handwriting recognition engine. In the modified CTC engine, the neural network-based sequence classifier, described above with respect to step 302, is trained with the CTC output layer using a forced alignment. The forced alignment may be derived from the segmentation performed by the SEG process. The forced alignment configures (or biases) the CTC output layer such that, during inference, in response to a handwriting input, the peak probability of observing a given character is more likely to occur, in the output 612 of the CTC output layer, within one or more respective segments of the handwriting input associated with the given character. It is reminded that according to standard CTC, the peak probability may occur anywhere within the handwriting input with no bias toward a particular segment.

Figure 8:
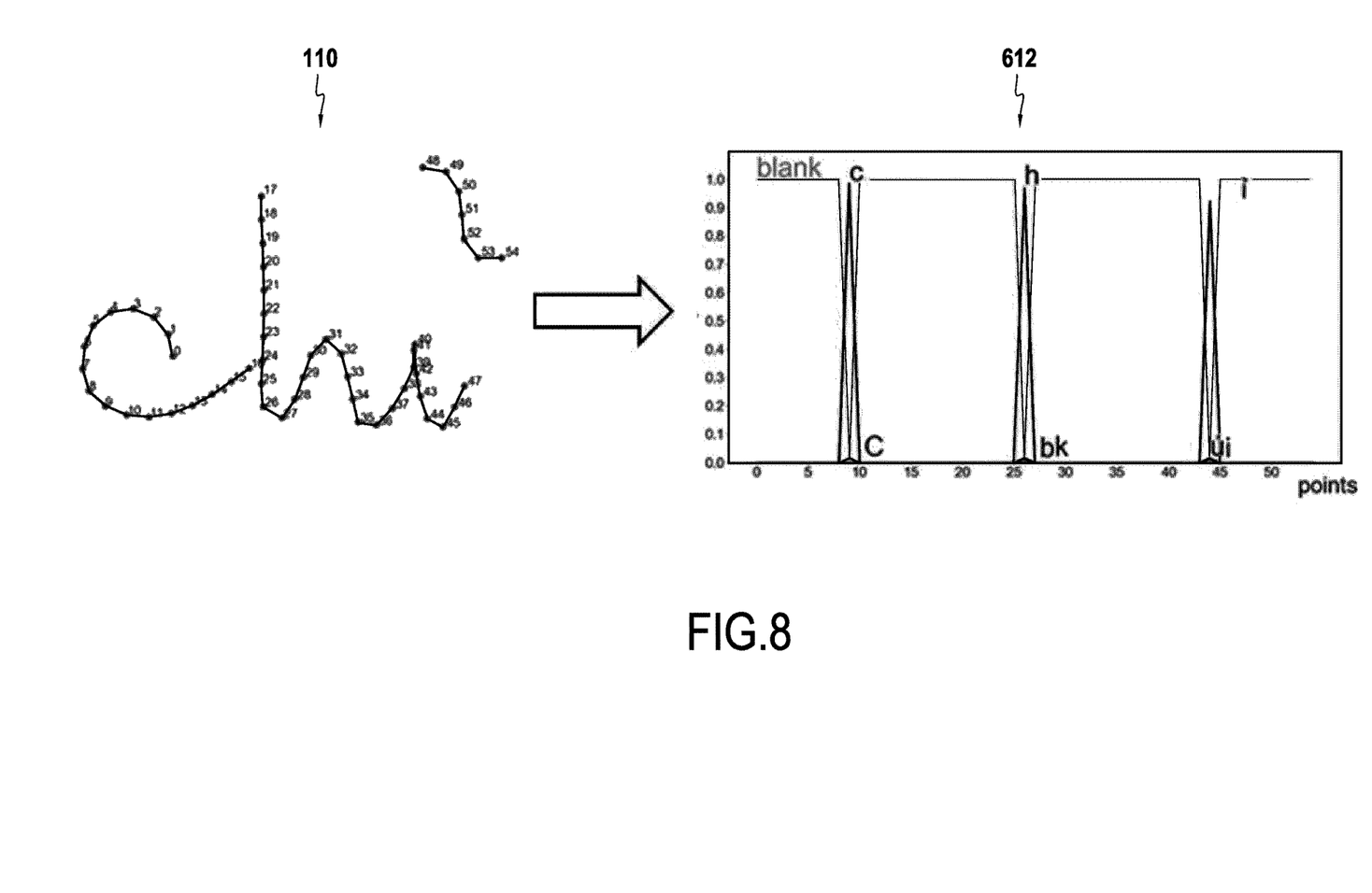
FIG. 8 is an example that illustrates the output of the CTC output layer in response to an input in the hybrid SEG/CTC approach.

For example, referring to FIG. 8 which illustrates the output 612 of the CTC output layer in step 602 in response to the handwriting input 110 comprising the word "chi", it can be seen that the forced alignment training configures the CTC output layer such that the peak probability for the character "c" occurs within the segment 202-1 of ink points 0-12, which contains the character "c" in the handwriting input 110. This is in contrast to the output 402 shown in FIG. 4 of a traditional CTC output layer, in which the probability peak for the character "c" only appears at around ink point number 30. Similarly, in this example, the peaks for the characters "h" and "i" are configured to occur in respective segments that actually contain the characters.

In an embodiment, the one or more respective segments associated with the given character may be determined by segmentation of the input before training and provided to the CTC engine during training. For example, a segmentation module (not shown in FIG. 6) may be used to segment the handwriting input and to associate each character with one or more respective segments of ink points of the input.

In another embodiment, the segmentation may be obtained using a forced alignment process applied with the character classifier alone. The forced alignment process associates one or more respective segments with the given character.

Based on the one or more respective segments associated with a given character, the CTC output layer, during training, computes probabilities of observing the given character only at the respective ink points of the one or more respective segments corresponding to the character. For example, referring to FIG. 8, assuming that the character "c" is associated with the segment of ink points 0-12, the CTC output layer would only compute probabilities of observing the character "c" at each of the ink points 0-12. The consequence of such a constraint is that a peak probability for the character "c" can only occur, during training, within the segment of ink points 0-12.

Figure 7:
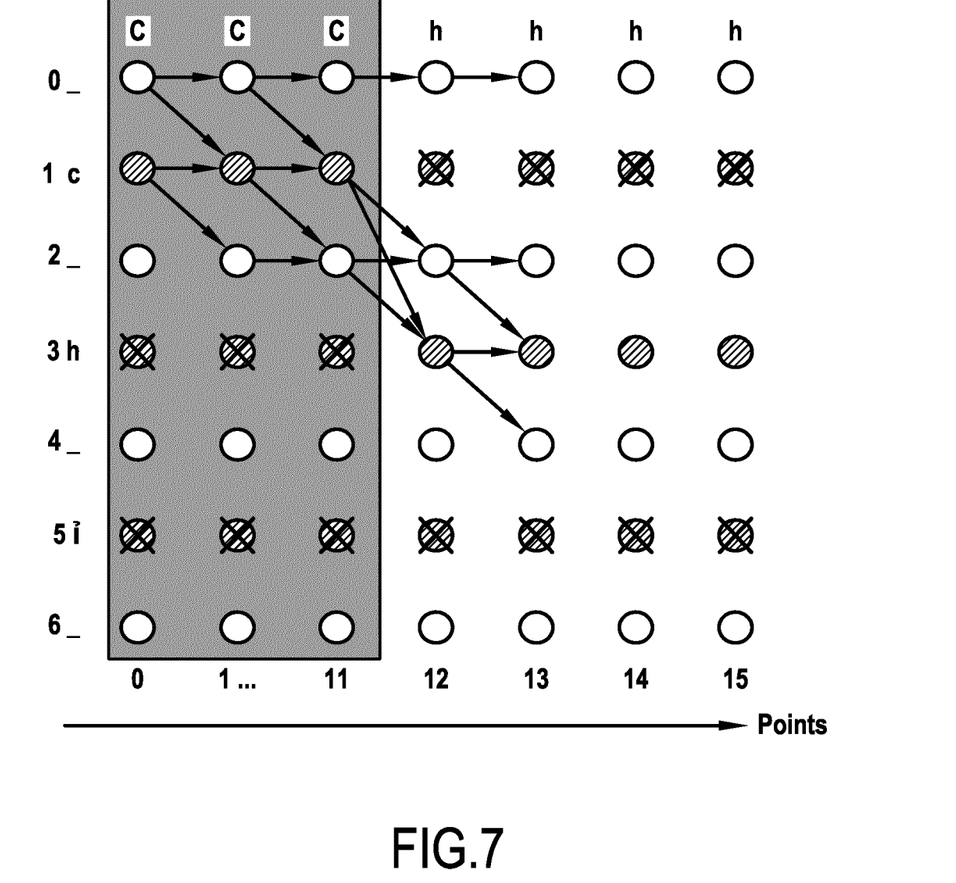
FIG. 7 illustrates an example forward pass that may be performed on the output of the CTC output layer in the hybrid SEG/CTC approach of FIG. 6.

In another embodiment, the forced alignment training of the neural network-based sequence classifier comprises applying an input sequence to the neural network-based sequence classifier; and limiting outputs of the neural network-based sequence classifier, on each segment of a plurality of segments of the input sequence, to a blank character or to a character of the input sequence associated with said each segment. The character of the input sequence may be associated with the said each segment by a forced alignment process, e.g., performed by the character classifier. Limiting the outputs of the neural network-based sequence classifier in this fashion forces the CTC output layer to recognize the character of the input sequence only within the one or more respective segments of the input sequence containing the character. The effect of such a constraint, illustrated in FIG. 7 with respect to an example forward pass that may be performed on the output of the CTC output layer, is that the considered paths are limited to those that could actually correspond to the input sequence. For example, at ink points 0-11, only the character "c" or a blank character are allowed to be observed. In other words, among the characters "c", "h", and "i", only the character "c" would be allowed to have a peak probability in the range of ink points 0-11.

During inference, in response to the handwriting input, the output 612 of the CTC output layer comprises, for a given character of a pre-defined alphabet, the probabilities of observing the given character at each ink point of the sequence of ink points. Due to the forced alignment training, the peak probability of observing the given character is more likely to occur, in the output 612 of the CTC output layer, within the one or more respective segments of the handwriting input associated with the given character.

As described above, the SEG approach generates a character hypothesis as a portion of the sequence of ink points, and applies the character hypothesis to a character classifier to obtain a first probability corresponding to the probability that the character hypothesis includes a given character associated with the character hypothesis (e.g., the character "h" associated with the character hypothesis 610). Thus, in order to be able to combine the SEG and CTC approaches, in steps 604 and 606, the output 612 of the CTC output layer is processed to determine a second probability corresponding to the probability that the given character (e.g., "h") is observed within the same character hypothesis (e.g., 610) used by the SEG approach.

Specifically, in step 604, the output 612 of the CTC output layer is filtered based on the character hypothesis 610 adopted by the SEG approach. In an embodiment, as shown in FIG. 6, filtering the output 612 of the CTC output layer comprises extracting from the output 612 of the CTC output layer a set of probabilities corresponding to the character hypothesis 610. Specifically, the set of probabilities that are extracted correspond to all probabilities computed in step 602, for any given alphabet character (or blank), for the ink points falling in the character hypothesis 610.

Due to the forced alignment training, the peak probability of observing the given character (e.g., "h") occurs, in the output 612 of the CTC output layer, within the respective segment of the handwriting input associated with the given character during training. Thus, in the example of FIG. 6, when the output 612 of the CTC output layer is filtered based on the character hypothesis 610, which is associated with the character "h" as a character candidate, the filtered output 614 contains the peak probability of observing the character "h".

Subsequently, in step 606, the filtered output 614 of the CTC output layer is decoded to obtain the second probability corresponding to the probability that the given character (e.g., "h") is observed within the same character hypothesis (e.g., 610) used by the SEG approach.

In an embodiment, decoding the filtered output 614 to obtain the second probability comprises: representing the given character by a hidden Markov model (HMM) having three states: blank, character, and blank; and performing a forward pass through the filtered output 614 to compute the second probability. The forward pass may be as described above in FIG. 7 with the expected label being a single symbol (the character being considered).

Finally, step 608 includes combining the first probability and the second probability to obtain a combined probability corresponding to the probability that the character hypothesis includes the given character. In an embodiment, combining the first probability and the second probability to obtain the combined probability comprises calculating a weighted combination of the first probability and the second probability.

Figure 9:
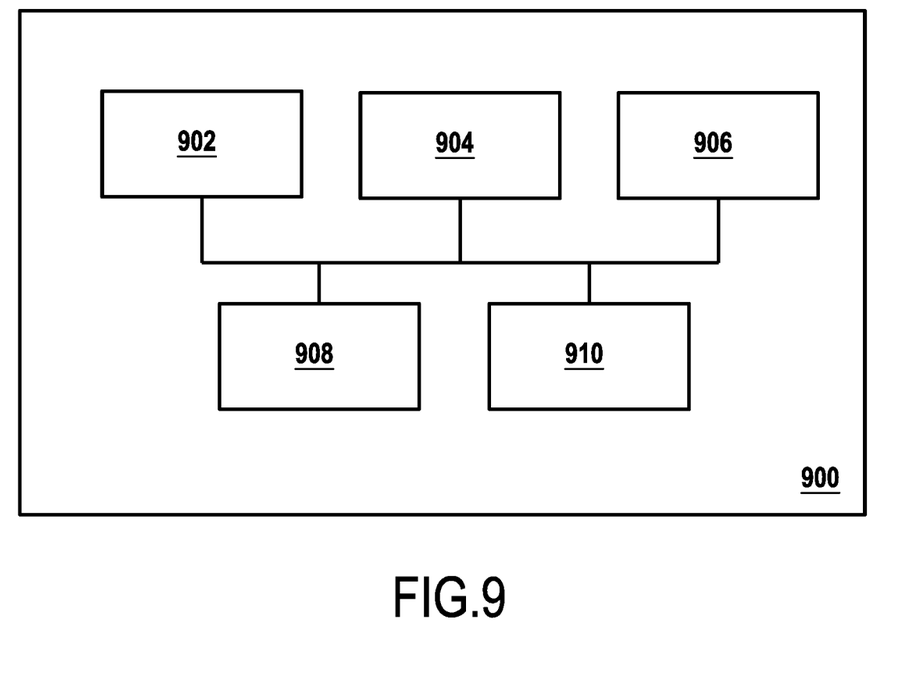
FIG. 9 illustrates an example computer device which may be used to implement embodiments of the present invention.

FIG. 9 illustrates a computer device 900 which may be used to implement embodiments of the present invention. As shown in FIG. 9, computer device 900 includes a processor 902, a read-only memory (ROM) 904, a random access memory (RAM) 906, a non-volatile memory 908, and communication means 910. The ROM 904 of the computer device 900 may store a computer program including instructions that when executed by processor 902 cause processor 902 to perform a method in accordance with an embodiment of the present invention. The method may include one or more of the steps described above in FIG. 6.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for recognizing handwritten text in user input applied onto a touch-based user interface, comprising:
receiving data representing the user input, the data comprising a sequence of ink points;
applying the received data to a neural network-based sequence classifier trained with a Connectionist Temporal Classification (CTC) output layer using forced alignment to generate an output, wherein the output of the CTC output layer comprises, for a given character of a pre-defined alphabet, the probabilities of observing the given character at each ink point of the sequence of ink points;
generating a character hypothesis as a portion of the sequence of ink points;
applying the character hypothesis to a character classifier to obtain a first probability corresponding to the probability that the character hypothesis includes the given character;
processing the output of the CTC output layer to determine a second probability corresponding to the probability that the given character is observed within the character hypothesis; and
combining the first probability and the second probability to obtain a combined probability corresponding to the probability that the character hypothesis includes the given character.

2. The method of claim 1, wherein the forced alignment configures the CTC output layer to increase the likelihood that a peak probability among the probabilities of observing the given character occurs within one or more respective segments associated with the given character.

3. The method of claim 2, wherein the one or more respective segments associated with the given character are obtained by segmentation of the sequence of ink points.

4. The method of claim 1, comprising training the neural network-based sequence classifier, wherein said training comprises:
applying an input sequence to the neural network-based sequence classifier; and
limiting outputs of the neural network-based sequence classifier, on each segment of a plurality of segments of the input sequence, to a blank character or to a character of the input sequence associated with said each segment.

5. The method of claim 4, wherein limiting the outputs of the neural network-based sequence classifier forces the CTC output layer to recognize the character of the input sequence only within one or more segments of the input sequence containing the character.

6. The method of claim 1, wherein generating the character hypothesis comprises:
segmenting the sequence of ink points into a plurality of segments; and generating the character hypothesis as one or more segments of the plurality of segments.

7. The method of claim 1, wherein processing the output of the CTC output layer to determine the second probability comprises:
filtering the output of the CTC output layer based on the character hypothesis; and
decoding the filtered output to obtain the second probability.

8. The method of claim 7, wherein filtering the output of the CTC output layer comprises extracting from the output of the CTC output layer a set of probabilities corresponding to the character hypothesis.

9. The method of claim 7, wherein decoding the filtered output to obtain the second probability comprises:
representing the given character by a hidden Markov model having three states:
blank, character, and blank; and
performing a forward pass through the filtered output to compute the second probability.

10. The method of claim 1, wherein combining the first probability and the second probability to obtain the combined probability comprises calculating a weighted combination of the first probability and the second probability.

11. The method of claim 1, wherein the received data is pre-processed.

12. A computing device, comprising:
a processor; and
a memory storing instructions that, when executed by the processor, configure the processor to:
receive data representing the user input, the data comprising a sequence of ink points;
apply the received data to a neural network-based sequence classifier trained with a Connectionist Temporal Classification (CTC) output layer using forced alignment to generate an output, wherein the output of the CTC output layer comprises, for a given character of a pre-defined alphabet, the probabilities of observing the given character at each ink point of the sequence of ink points;
generate a character hypothesis as a portion of the sequence of ink points;
apply the character hypothesis to a character classifier to obtain a first probability corresponding to the probability that the character hypothesis includes the given character;
process the output of the CTC output layer to determine a second probability corresponding to the probability that the given character is observed within the character hypothesis; and
combine the first probability and the second probability to obtain a combined probability corresponding to the probability that the character hypothesis includes the given character.

13. A non-transitory computer-readable storage medium having instructions embodied thereon, the instructions being executable by one or more processors to perform a method for recognizing handwritten text in user input applied onto a touch-based user interface, comprising:
receiving data representing the user input, the data comprising a sequence of ink points;
applying the received data to a neural network-based sequence classifier trained with a Connectionist Temporal Classification (CTC) output layer using forced alignment to generate an output, wherein the output of the CTC output layer comprises, for a given character of a pre-defined alphabet, the probabilities of observing the given character at each ink point of the sequence of ink points;
generating a character hypothesis as a portion of the sequence of ink points;
applying the character hypothesis to a character classifier to obtain a first probability corresponding to the probability that the character hypothesis includes the given character;
processing the output of the CTC output layer to determine a second probability corresponding to the probability that the given character is observed within the character hypothesis; and
combining the first probability and the second probability to obtain a combined probability corresponding to the probability that the character hypothesis includes the given character.

* * * * *